Dec. 13, 1955  V. J. KOMUCHAR ET AL  2,726,662
COMBINED CONVEYOR AND MEANS FOR REMOVING
VINES FROM POTATOES IN POTATO HARVESTERS
Filed Dec. 2, 1952

INVENTORS.
Victor J. Komuchar
John E. Jammie
Paul O. Pippel
Atty.

United States Patent Office 2,726,662
Patented Dec. 13, 1955

2,726,662

COMBINED CONVEYOR AND MEANS FOR REMOVING VINES FROM POTATOES IN POTATO HARVESTERS

Victor J. Komuchar, Brookfield, and John E. Gammie, Chicago, Ill., assignors to International Harvester Company, a corporation of New Jersey Application December 2, 1952, Serial No. 323,533

8 Claims. (Cl. 130—30)

This invention relates to conveyors for potato harvesters and more specifically to a novel conveyor incorporating means for removing vines from the potatoes and sifting out the dirt.

A general object of the invention is to provide a novel conveying apparatus of simple and inexpensive design and wherein the parts are formed and arranged to provide a rugged, durable and efficient construction.

A more specific object of the invention is to devise a conveyor incorporating a series of rolls driven in the same direction and arranged in side-by-side spaced relationship wherein alternate rolls rotatably journal a series of axially spaced disks which have frictional peripheral engagement with the fore and aft rolls disposed at diametrically opposite sides thereof and driven thereby in reverse direction as respects the direction of rotation of the rolls, the disks functioning to pinch the vines in cooperation with the roll thereahead to thereby pull the vines downwardly between the same whereby to snap the vines off the potatoes.

A further object is to arrange the disks on succeeding alternate rolls in staggered relationship laterally of the conveyor so as to cover the full width of the conveyor to obtain maximum interception of the aggregate as it is moving from the receiving to the discharge end of the conveyor and at the same time present minimum obstruction to the general direction of flow of the potatoes.

A still further object of the invention is to design vine removing disks which are relatively narrow or thin axially and which at least have a rubber tired periphery in order to reduce bruising, cutting or other injury to the potatoes.

Another object of the invention is to design the diskless rolls preferably with corrugated peripheral surfaces to increase their aggressiveness in advancing the aggregate, that is, the potatoes with the dirt and other debris, from the intake end of the conveyor to the discharge end, and to provide relatively smooth cylindrical peripheral surfaces on the disk-rolls so as to decrease their rearward delivery aggressiveness and thereby cause the potatoes to tumble and linger awhile in the bight developed between the diskless and the disk rolls alongside the vine removing disks and thereby improve the probability of the vines entering and being grasped between the disks and the diskless rollers.

Another object is to provide novel flippers on certain of the rolls to facilitate transfer and improve agitation of the aggregate.

These and other objects of the invention will become more apparent from the specification and the drawings, wherein.

Figures 1, 2, 3, 4:
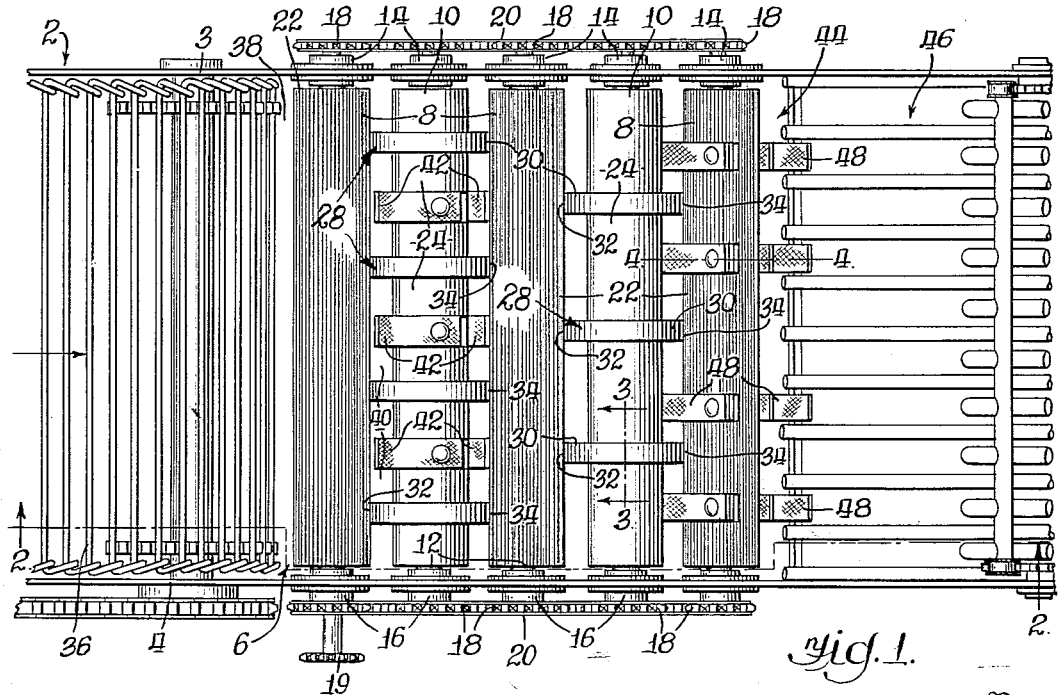
Figure 1 is a fragmentary top plan view of the novel apparatus.
Figure 2 is a vertical sectional view of the structure shown in Figure 1 taken substantially on line 2—2 of Figure 1.
Figure 3 is an enlarged fragmentary axial sectional view of one of the disk carrying rolls, and taken substantially on line 3—3 of Figure 1.
Figure 4 is an enlarged transaxial sectional view of one of the flay carrying rolls taken substantially on line 4—4 of Figure 1.

Describing the invention in detail, the combination conveying, vine removing, and dirt sifting apparatus, generally designated 2, comprises a conveyor including a pair of laterally spaced generally parallel upright side support members 3 and 4 disposed at the lateral extremes of the conveyor, the members 3 and 4 extending upwardly above the bed 6 of the conveyor and providing confining side shields for the aggregate being transported on the conveyor.

The bed 6 includes a series of side-by-side generally parallel transversely aligned first rolls 8, 8 and a series of disk or second rolls 10, 10 disposed in alternating relationship with the rolls 8, 8.

Each roll 8 and 10 is provided with a center shaft 12, which, at opposite ends is carried by bearing members 14 and 16 suitably connected to the respective side support members 3 and 4. Each shaft 12 is provided at one or both ends with a sprocket 18 and the rolls 8 and 10 are all driven in the same direction by a common chain 20 which may be driven from a suitable power source. Of course, it will be understood that the shaft 12 of any roll 8 or 10 may be provided with a separate sprocket such as 19 or any other drive connection to a suitable power source.

The diskless rolls 8, 8 are preferably provided with a rubber core having an outer peripheral corrugated surface 22 which may be fluted axially of the roll. Each roll 8 is preferably of substantially constant diameter from end to end.

Each roll 10 is of segmental construction and comprises the central shaft 12 with a plurality of cylindrical, preferably rubber, roll sections 24, 24 sleeved thereon and spaced at adjacent ends from each other. Each roll section 24 is secured to the shaft 12 as by means of a key 26 whereby the roll sections 24, 24 are constrained for rotation with the related shaft 12. It will be understood that the connection of each section 24 with the associated shaft 12 may be of any suitable design.

A series of relatively thin circular disks or stripping rollers 28, 28 are journaled upon the shaft 12 of each roll 10, the disks 28 being disposed between the ends of adjacent roll sections 24, 24. Each disk 28 is of larger diameter than the roll sections 24, 24 and each is provided with a metallic center section 28a rimmed with a rubber tire 30 about its outer periphery to minimize abrasion injury to the potatoes.

The flexible rings 30 of the disk 28 are tightly pressed on their outer peripheries at diametrically opposed areas with the corrugated peripheral surfaces 22 of the rolls 8, 8, fore and aft thereof as at 32 and 34 for driving action thereby. It will be observed that while all of the rolls are rotating with their uppersides moving rearwardly as seen by the arrow in Figure 2, the disks rotate with their upper edges moving forwardly (arrow in Figure 2) as driven by the rolls fore and aft thereof.

It will be noted that the disks of successive rolls 10, 10 are offset axially with respect to each other so that the disks of succeeding rolls 10, 10 are arranged somewhat in an alternating relationship laterally of the conveyor and span the entire width of the conveyor.

In operation, the aggregate is deposited at the intake end of the conveyor by a shaker chain conveyor 36 of conventional construction and carried in usual manner from the side members 2 and 4 in series with the conveyor of the instant invention. The aggregate is transferred to the first roller 8, which rotating in a clockwise direction as seen in Figure 2, transfers to the succeeding roller 10. It will be apparent that the space or bight 38 between the end of the shaker chain conveyor 36 and the first roll 8 will permit some of the loose dirt and small stones to fall to the ground. The surface 22 of the roll 8, being corrugated, is aggressive and will rapidly discharge the aggregate into the bight or nip space 40 between the discharge side of the first roll 8 and the forward side of the succeeding roll 10. It will be observed that the sections 24 of the second roll 10 are preferably provided with smooth cylindrical outer surfaces so as not to advance the aggregate too rapidly to the third roll. This subjects the aggregate to a tumbling action so that the aggregate is more or less transferred to the third roll partially by the frictional contact with the roll 10 and partially by the shifting of the oncoming increment of the aggregate therebehind, and partially by the diametrically opposed yieldable radially extending flippers or flails 42, 42 connected to the sections 24 of the first roll 10 and preferably made of tire carcass. During this tumultuous agitated action, a large portion of the dirt will fall through the spaces 40 at the bight. The tumbling action is conducive to roll the potatoes so that the vines are passed over the peripheries of the vine removing disks, which, rotating in the reverse direction with respect to the rolls, grasp the vines between their peripheries and the corrugated surfaces 22 of the rolls thereahead and by pulling downwardly rip the vines off the potatoes. It will be noted that the action described between the first and second rolls 8 and 10 continues until the aggregate is discharged off the discharge end 44 of the conveyor into associated receiving means 46.

It will be understood that the rolls 8 and 10 may be smooth faced, that is, cylindrical on their outer peripheries and both the disks and the rolls may be made of rubber of desired hardness. The conveyor under these circumstances may be inclined downwardly rearwardly to improve the flow of the aggregate from the intake to the discharge extremities thereof.

The last roll 8 may also have flails 48, 48 secured thereto, to effect a rapid transfer into the receiver 46. The flails 42 and 48 may have whipping contact with the rolls thereadjacent to crumble dirt clods and agitate the aggregate.

What is claimed is:

1. For a potato harvester, a combination conveyor, sifter and vine removing apparatus adapted to transport the potatoes from one end to the other end thereof while sifting dirt and the like and removing the vines therefrom and comprising a plurality of first and second generally parallel alternately positioned transversely spaced rolls disposed in side-by-side relationship and all driven in the same direction, means supporting said rolls in said relationship, a plurality of circular disks journaled on each of said second rolls and spaced axially thereof, each disk having a diameter greater than its associated second roll and in a frictional peripheral driven contact with the first rolls at diametrically opposed sides thereof and driven by both of said contacting first rolls in the reverse direction with respect to the direction of rotation of the rolls, said disks on each of said second rolls and the associated first roll thereahead with reference to said one end of said conveyor defining vine-grasping nips therebetween.

2. The combination according to claim 1 wherein said disks of successive second rolls are offset axially with respect to each other whereby the disks of several of the disk-carrying rolls span the space across the width of the apparatus, said disks of succeeding second rolls spaced by said first rolls in the direction of discharge of said apparatus.

3. The combination according to claim 1, and at least the edge of each disk comprising a peripheral portion formed of flexible material to reduce abrasion against the potatoes and said portion compressed radially of the disk between the adjacent of said first rolls.

4. In an apparatus of the type described, support means, a plurality of rolls arranged in side-by-side relationship on said support means and spaced transversely from each other, certain of said rolls having corrugated peripheral surfaces, other of said rolls having a relatively smooth outer contour and alternated with said certain rolls, said other of said rolls, each including a plurality of disk members of larger diameter than the same and journaled on and spaced axially thereof and in rolling contact with opposing sides of said certain rolls thereadjacent for rotation in an opposite direction to said certain rolls, and means for driving all of said rolls for rotation in a common direction.

5. In an apparatus of the class described, a support, a plurality of alternately arranged first and second rolls rotatably carried by the support on generally parallel axes and in transverse alignment with each other, at least one circular stripping element journaled on the said second of said rolls coaxially therewith, said element being of larger diameter than the associated second roll, means for rotating all of said rolls in one direction, and drive-transmitting means between each element and the adjacent of said first rolls for rotating said element in a direction opposite to that of said rolls and comprising opposing contacting peripheries thereon and defining an intake nip therebetween.

6. The invention according to claim 5, and further characterized in that the first of said rolls comprise a rough peripheral surface and the second of said rolls comprise smooth peripheral surfaces intermediate said elements.

7. The combination according to claim 5, and said rolls spaced laterally apart, and said element having peripheral frictional drive engagement at diametrically opposite points with the said first rolls at opposite sides of its associated second roll for rotation thereby.

8. In a conveying device, three transversely aligned laterally spaced rolls rotatably supported on generally parallel axes and collectively defining a conveyor bed means driving all of said rolls in the same direction, a plurality of rotary stripping rollers journalled on the intermediate roll and spaced axially thereof and extending radially between the other two rolls and of larger diameter than said intermediate roll and in peripheral engagement therewith in driven relation thereby, a plurality of flexible flails on at least one of said other rolls extending radially therefrom and spaced axially thereof and in alternating relation with said rollers and having a length greater than the space between the associated roll and said intermediate roll.

References Cited in the file of this patent

UNITED STATES PATENTS

| | | |
|---|---|---|
| 1,014,493 | Lauritzen et al. | Jan. 9, 1912 |
| 1,486,079 | Fernandez | Mar. 4, 1924 |
| 1,629,977 | Snyder | May 24, 1927 |
| 1,641,777 | Newhouse | Sept. 6, 1927 |
| 2,277,450 | Parr | Mar. 24, 1942 |
| 2,633,685 | Edwards | Apr. 7, 1953 |